(12) United States Patent
Needham et al.

(10) Patent No.: US 9,635,848 B2
(45) Date of Patent: May 2, 2017

(54) SPRAY SYSTEM WITH SPEED-BASED PRESSURE CONTROLLER AND METHOD OF CONTROLLING SAME

(71) Applicant: Capstan Ag Systems, Inc., Topeka, KS (US)

(72) Inventors: Duane Needham, San Francisco, CA (US); Troy C. Kolb, Hiawatha, KS (US); Gordon Hooper, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 0 days.

(21) Appl. No.: 14/798,635

(22) Filed: Jul. 14, 2015

(65) Prior Publication Data

US 2016/0015020 A1    Jan. 21, 2016

Related U.S. Application Data

(60) Provisional application No. 62/025,137, filed on Jul. 16, 2014.

(51) Int. Cl.
| | |
|---|---|
| *A01M 7/00* | (2006.01) |
| *B05B 9/06* | (2006.01) |
| *B05B 12/00* | (2006.01) |
| *B05B 12/06* | (2006.01) |
| *B05B 12/08* | (2006.01) |

(52) U.S. Cl.
CPC .............................. *A01M 7/0089* (2013.01)

(58) Field of Classification Search
CPC ...... A01M 7/0089; B05B 9/06; B05B 12/006; B05B 12/008; B05B 12/02; B05B 12/04; B05B 12/06; B05B 12/085
See application file for complete search history.

(56) References Cited

U.S. PATENT DOCUMENTS

| 4,392,611 | A | * | 7/1983 | Bachman | ............ | A01M 7/0089 222/613 |
| 4,530,463 | A | * | 7/1985 | Hiniker | ............... | A01M 7/0089 239/155 |
| 5,134,961 | A | | 8/1992 | Giles et al. | | |
| 5,520,333 | A | * | 5/1996 | Tofte | .................... | A01B 79/005 137/599.05 |
| 5,653,389 | A | | 8/1997 | Henderson et al. | | |
| 5,967,066 | A | | 10/1999 | Giles et al. | | |

(Continued)

*Primary Examiner* — Darren W Gorman
(74) *Attorney, Agent, or Firm* — Armstrong Teasdale LLP

(57) ABSTRACT

Spray systems and control systems for use with spray systems are provided. A spray system generally includes a tank configured to hold a product, a conduit in fluid communication with the tank, a pump in fluid communication with the conduit, a flow controller, a plurality of electrically actuated nozzle assemblies in fluid communication with the conduit, and a pressure controller. The flow controller is configured to regulate a flow rate of product through the conduit based on a travel speed of the system. The plurality of nozzle assemblies is configured to dispense the product such that an upstream nozzle pressure is established within the conduit. The pressure controller is configured to control at least one operating parameter of at least one of the nozzle assemblies based at least in part on speed information indicative of the travel speed of the system to maintain a substantially constant upstream nozzle pressure.

18 Claims, 9 Drawing Sheets

(56) References Cited

U.S. PATENT DOCUMENTS

| | | | |
|---|---|---|---|
| 6,749,128 B1 * | 6/2004 | Oosterman | A01C 23/047 239/155 |
| 7,162,961 B2 | 1/2007 | Grimm et al. | |
| 7,278,294 B2 | 10/2007 | Giles et al. | |
| 7,311,004 B2 | 12/2007 | Giles | |
| 7,502,665 B2 | 3/2009 | Giles et al. | |
| 7,742,842 B2 | 6/2010 | Giles et al. | |
| 7,826,930 B2 | 11/2010 | Giles et al. | |
| 8,191,795 B2 | 6/2012 | Grimm et al. | |
| 8,250,907 B2 | 8/2012 | Giles | |
| 8,523,085 B2 | 9/2013 | Grimm et al. | |
| 2006/0273189 A1 * | 12/2006 | Grimm | B05B 9/0423 239/146 |
| 2008/0251600 A1 * | 10/2008 | Sorensen | A01M 7/0089 239/63 |
| 2012/0228395 A1 | 9/2012 | Needham et al. | |
| 2014/0299673 A1 | 10/2014 | Grimm et al. | |

\* cited by examiner

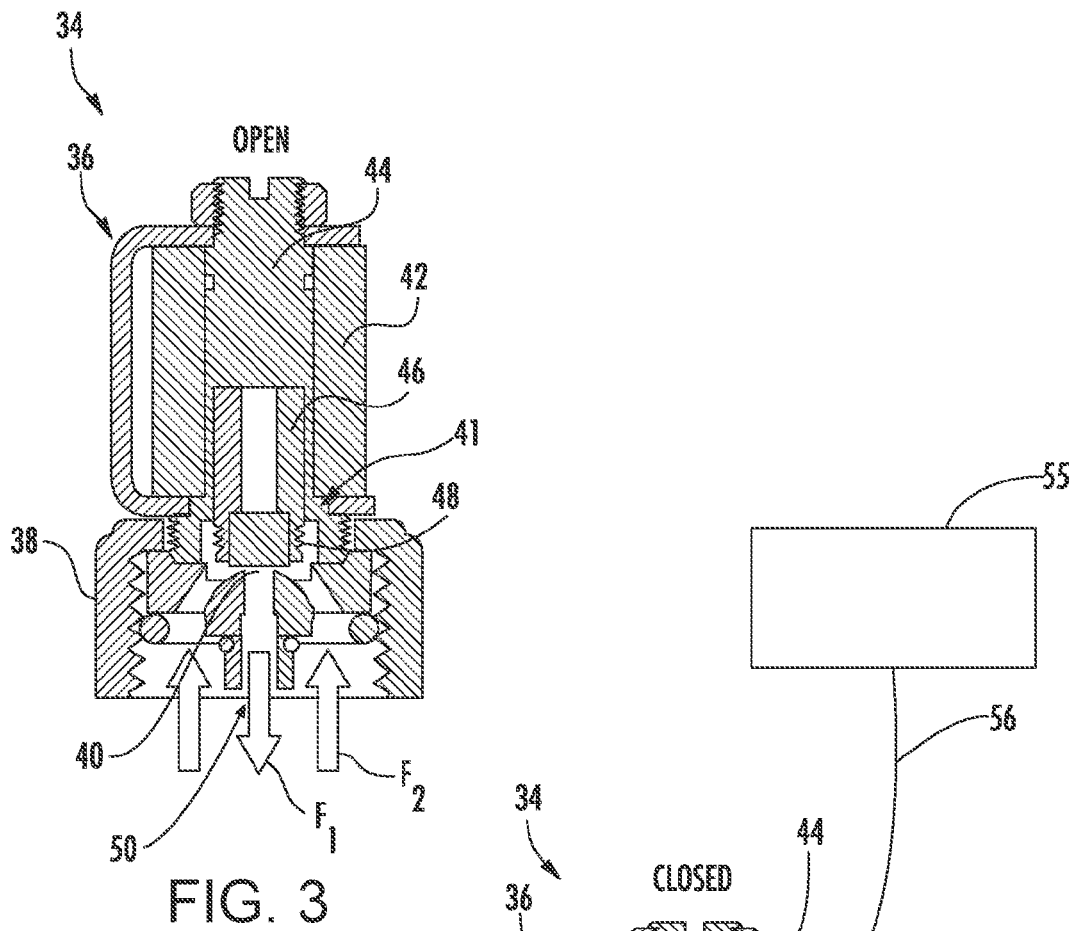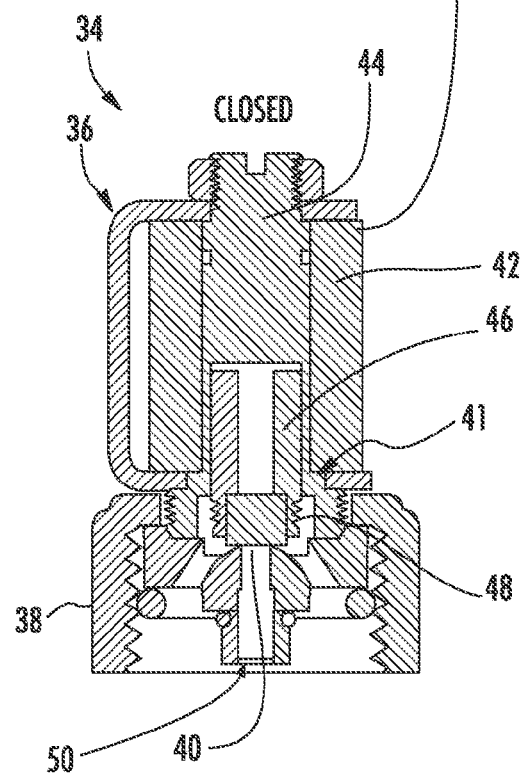

SPRAY SYSTEM WITH SPEED-BASED PRESSURE CONTROLLER AND METHOD OF CONTROLLING SAME

CROSS-REFERENCE TO RELATED APPLICATIONS

This application claims the benefit of U.S. Provisional Application No. 62/025,137, filed on Jul. 16, 2014, which is incorporated by reference herein in its entirety.

BACKGROUND

The present disclosure relates generally to spray systems and, more particularly, to control systems for use with spray systems and methods of controlling spray systems.

Spraying is a well-known method of applying a wide variety of bulk materials, primarily in liquid form or a mixture of liquid and powder in a fluid propellant medium. Such spray materials can be dispensed in air currents, under liquid pressure, by gravity flow, or with any other suitable discharge means. Spray application of bulk materials may offer a variety of potential advantages, including efficiency, uniformity of coverage, and flexibility to adapt spraying equipment to various conditions unique to the objects being sprayed and their particular environments.

The field of agricultural spraying is a relatively large industry and may include pesticide application for crop pest management and the application of fertilizer and growth regulators for nutrient management. The use of pesticides in agricultural applications may produce substantial benefits in crop yields with a potentially large amount of estimated savings in crops which may otherwise have been lost to pests. Similarly, the spray application of fertilizers and growth regulators may also produce substantial benefits in crop yields and the like.

Notwithstanding the potential advantages of agricultural spraying applications of pesticides and other spray materials, agricultural spraying may generally be a relatively inefficient process. Factors which contribute to such inefficiencies include the susceptibility of sprayed materials to wind drift, overspray, and inaccurate placement on the intended target crop plants. Irregularities in terrain and non-uniform plantings also contribute to the inconsistent and inefficient application of agricultural spray materials. Moreover, variations in ambient conditions such as wind, humidity levels, and temperature tend to reduce the uniformity and efficiency with which spray materials are applied to their intended crop targets.

Certain of these problems associated with the misapplication of agricultural spray materials may in some cases be exacerbated by the use of larger spraying equipment covering wider swaths, high speed vehicles, air-blast spraying, and by aerial spraying. However, the inherent difficulties associated with large-scale spraying operations may be balanced against the relative efficiencies which are achieved by covering larger areas more rapidly with wide-swath spraying equipment.

Certain of the above problems may be addressed by control of an application rate of the spray liquid. A common technique for controlling the application rate of spray liquid involves adjusting the spray liquid pressure, for example, with the use of a throttling valve in a main distribution line of a spray liquid distribution system. However, altering the liquid pressure also generally alters a droplet size of the spray, thus effecting the deposition and its susceptibility to spray drift, evaporation, and other factors.

Accordingly, a spray system that is capable of controlling the application rate of the spray liquid while maintaining a consistent liquid pressure would be particularly useful.

BRIEF DESCRIPTION

In one aspect, a spray system configured to dispense a product as the system is moved at a travel speed is provided. The spray system includes a tank configured to hold a quantity of the product, a conduit in fluid communication with the tank, a pump in fluid communication with the conduit for generating a pressure in the conduit and a flow of the product through the conduit, a flow controller, a plurality of electrically actuated nozzle assemblies in fluid communication with the conduit, and a pressure controller. The flow controller is configured to regulate a flow rate of the product through the conduit based at least in part on the travel speed of the system. The plurality of nozzle assemblies is configured to dispense the product such that an upstream nozzle pressure is established within the conduit. The pressure controller is configured to receive speed information indicative of the travel speed of the system and control at least one operating parameter of at least one of the plurality of nozzle assemblies based at least in part on the speed information received to maintain a substantially constant upstream nozzle pressure.

In another aspect, a method of dispensing a product from a spray system moving at a travel speed is provided. The system includes a tank, a conduit in fluid communication with the tank, and a pump in fluid communication with the conduit. The method includes directing the product from the tank through the conduit to a plurality of electrically actuated nozzle assemblies, regulating a flow rate of the product through the conduit based at least in part on the travel speed of the system, dispensing the product from the plurality of nozzle assemblies such that an upstream nozzle pressure is established within the conduit, receiving speed information indicative of the travel speed of the system, and controlling at least one operating parameter of at least one of the plurality of nozzle assemblies based at least in part on the received speed information such that the upstream nozzle pressure is maintained at a substantially constant pressure.

In yet another aspect, a control system for use with a spray system is provided. The control system includes at least one speed input device configured to measure a travel speed of at least one of the control system and the spray system, a flow controller operatively connected to the at least one speed input device, and a pressure controller. The flow controller is configured to regulate a flow rate of product through a conduit of the spray system based at least in part on the travel speed. The pressure controller is configured to receive speed information indicative of the travel speed and to control at least one operating parameter of at least one of a plurality of electrically actuated nozzle assemblies in fluid communication with the conduit based at least in part on the received speed information such that a substantially constant upstream nozzle pressure is maintained within the spray system.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

FIG. 3 is a sectional view of a portion of the nozzle assembly of FIG. 2, the nozzle assembly including a valve assembly shown in an open position;

FIG. 4 is a sectional view of the portion of the nozzle assembly shown in FIG. 3 with the valve assembly in a closed position;

Corresponding reference characters indicate corresponding parts throughout the several views of the drawings.

DETAILED DESCRIPTION

Figure 1:
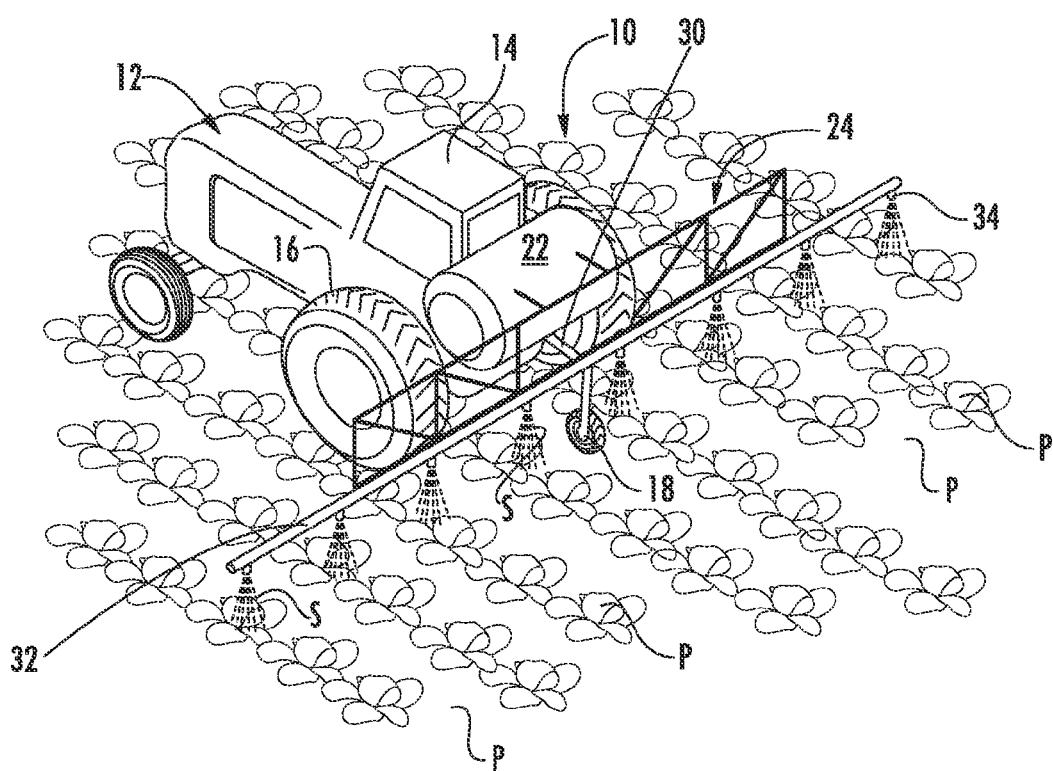
FIG. 1 is a perspective view of an example agricultural spray system.

Referring now to the Figures, FIG. 1 is a perspective view of an example spray system, indicated generally at 10, operatively connected to a work vehicle 12. As shown, the work vehicle 12 includes a cab 14 and a plurality of wheels 16. The work vehicle 12 may in certain embodiments be an agricultural tractor having any suitable configuration. However, it should be appreciated that in other embodiments, any other suitable aero or ground means may be provided for moving the spray system 10. For example, in other embodiments, the work vehicle 12 may not include a cab, and instead may have any suitable operator station. Further, in some embodiments, the work vehicle 12 and/or the spray system 10 may include a global positioning system (e.g., a GPS receiver) for automated control of the work vehicle 12 and/or the spray system 10. In some embodiments, the global positioning system is used to monitor a travel speed of the vehicle 12 and/or the spray system 10, and/or to monitor a position of the work vehicle 12 and/or the spray system 10.

In the example embodiment, the spray system 10 includes at least one boom wheel 18 for engaging a section of ground with a crop, produce, product or the like (generally, P), a tank or reservoir 22, and a spray boom 24. The spray boom 24 includes a plurality of nozzle assemblies 34 attached thereto and in fluid communication with the tank 22. The tank 22 holds a product S, such as a liquid, a mixture of liquid and powder, or other product. The product S may be a quantity of water or an agrochemical such as a fertilizer or a pesticide, and may be sprayed from the nozzle assemblies 34 onto, for example, a crop or produce or the ground P itself, as shown in FIG. 1 and described in greater detail below. It should be appreciated, however, that in other embodiments, the system 10 may have any other suitable configuration. For example, in other embodiments, the system 10 may not include a boom wheel 18 or may alternatively include any suitable number of boom wheels 18. Further, while the work vehicle 12 is depicted as towing the spray system 10 in the example embodiment, it should be appreciated that, in other embodiments, the work vehicle 12 may transport the spray system 10 in any suitable manner that enables the spray system 10 to function as described herein.

The quantity of product S held in the tank 22 generally flows through a conduit to the nozzle assemblies 34. More specifically, in the embodiment illustrated in FIG. 1, the product S flows from the tank 22, through a pipe 30 to a boom pipe 32, and from the boom pipe 32 to the nozzle assemblies 34. In certain embodiments, the nozzle assemblies 34 comprise direct acting solenoid valve equipped nozzles (see, e.g., FIGS. 2-4) and the system 10 may include a displacement pump and a flow controller (not shown in FIG. 1). If included, the displacement pump may be positioned downstream from the tank 22, upstream from the boom pipe 32 and nozzle assemblies 34, and in operative communication with the flow controller. The pump may be a pulse width modulation controlled pump configured to provide a desired amount of product S flow through the system 10. The flow controller may be configured to vary certain operating parameters of the pump, such as the pump's pulse frequency and/or duty cycle, to obtain a desired product flow rate through the system 10.

Referring still to FIG. 1, the product S flows through the nozzle assemblies 34 and may be applied to the ground P in various ways. For example, the product S may flow from the nozzle assemblies 34 in a pulsed pattern. It should be appreciated that terms "pipe" and "conduit," as used herein, may mean any type of conduit or tube made of any suitable material such as metal or plastic, and moreover that any other suitable ground application devices can be added to provide varying effects of placement of the product S on top or below a soil surface of the ground P, such as via pipes, knives, coulters, and the like.

Figure 2:
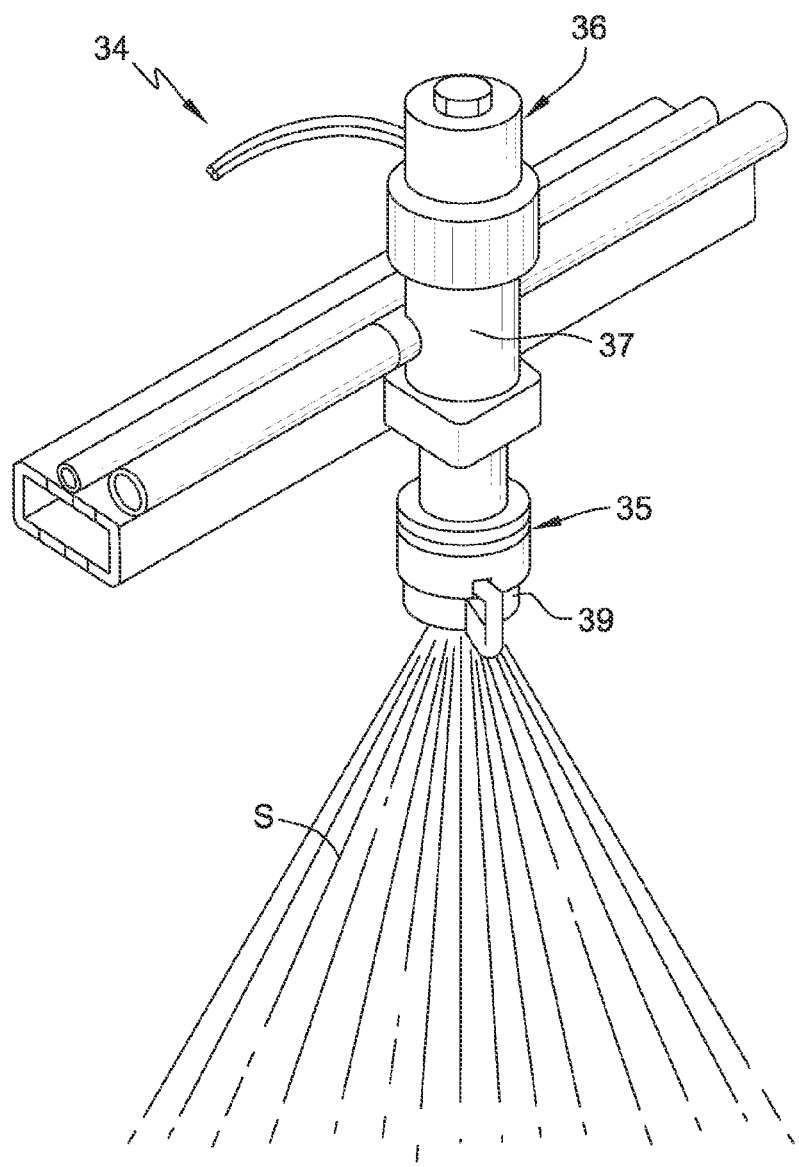
FIG. 2 is a perspective view of an example nozzle assembly suitable for use with the agricultural spray system of FIG. 1.

FIG. 2 is a perspective view of an example nozzle assembly 34 suitable for use with the spray system 10 of FIG. 1. As shown in FIG. 2, the nozzle assembly 34 generally includes a spray nozzle 35 and a valve assembly 36. The nozzle 35 includes a nozzle body 37 configured to receive the product S flowing through the boom pipe 32 and a nozzle head 39 mounted to and/or formed integrally with the nozzle body 37 for expelling the product S from the nozzle assembly 34 onto crops, product and/or the ground P.

In some embodiments, the valve assembly 36 is a solenoid valve (see, e.g., FIGS. 3 and 4). Moreover, in some embodiments, the valve assembly 36 may be configured to be mounted to and/or integrated within a portion of the spray nozzle 35. In some embodiments, for example, the valve assembly 36 may be mounted to the exterior of the nozzle body 37, such as by being secured to the nozzle body 37 through the nozzle's check valve port. Alternatively, the valve assembly 36 may be integrated within a portion of the nozzle body 37.

FIGS. 3 and 4 are sectional views of a portion of the nozzle assembly 34 shown in FIG. 2, illustrating the nozzle assembly 34 (specifically, the valve assembly 36) in an open position and a closed position, respectively. In the example embodiment illustrated in FIGS. 3 and 4, the nozzle assembly 34 is a direct acting solenoid valve equipped nozzle configured to pulse with a frequency and duty cycle such that an orifice 40 is active only when the nozzle assembly 34 is open (FIG. 3). The frequency may be sufficiently fast to diminish the dynamic effects of pulsing on the upstream system pressure and flow, therefore creating a controlled variable resistance to flow.

The example nozzle assembly 34 includes a mounting means such as a bracket or screw-fitting 38 for mounting the nozzle assembly 34 to, for example, the boom pipe 32 of FIG. 1. Additionally, the orifice 40 is configured for an outlet flow F1 and an inlet flow F2.

Referring still to FIGS. 3 and 4, the example nozzle assembly 34 also includes an actuator assembly 41, which has an actuator or coil 42 located on or around a guide 44. A plunger 46 is movably positioned between the guide 44 and the orifice 40. An electric wave generator 55, such as a square wave generator, is connected to the nozzle assembly 34 and applies an electric signal or voltage 56 to the coil 42, which establishes a magnetic field. The magnetic field passes through the guide 44 to create a magnetic field force, which attracts the plunger 46. In this example, the magnetic force of the guide 44 overcomes a spring force of a spring 48 and a force from differential pressure between the inlet fluid F2 and outlet fluid F1. When the plunger 46 lifts a seal from the orifice 40, the outlet flow F1 results through a tip 50 of the nozzle assembly 34. As will be discussed below, the electric wave generator 55 may be controlled by or incorporated into a system controller, such as a pressure controller 154 described with reference to FIG. 6, below.

It should be appreciated, however, that the nozzle assembly 34 shown in FIGS. 3 and 4 is provided by way of example only. In other embodiments, the nozzle assembly 34 may be of any other suitable design capable of creating a controlled variable resistance to flow. For example, although the nozzle assembly 34 is depicted as a normally closed solenoid valve equipped nozzle, in other embodiments, the nozzle assembly 34 may alternatively be a normally open solenoid valve equipped nozzle.

Figure 5:
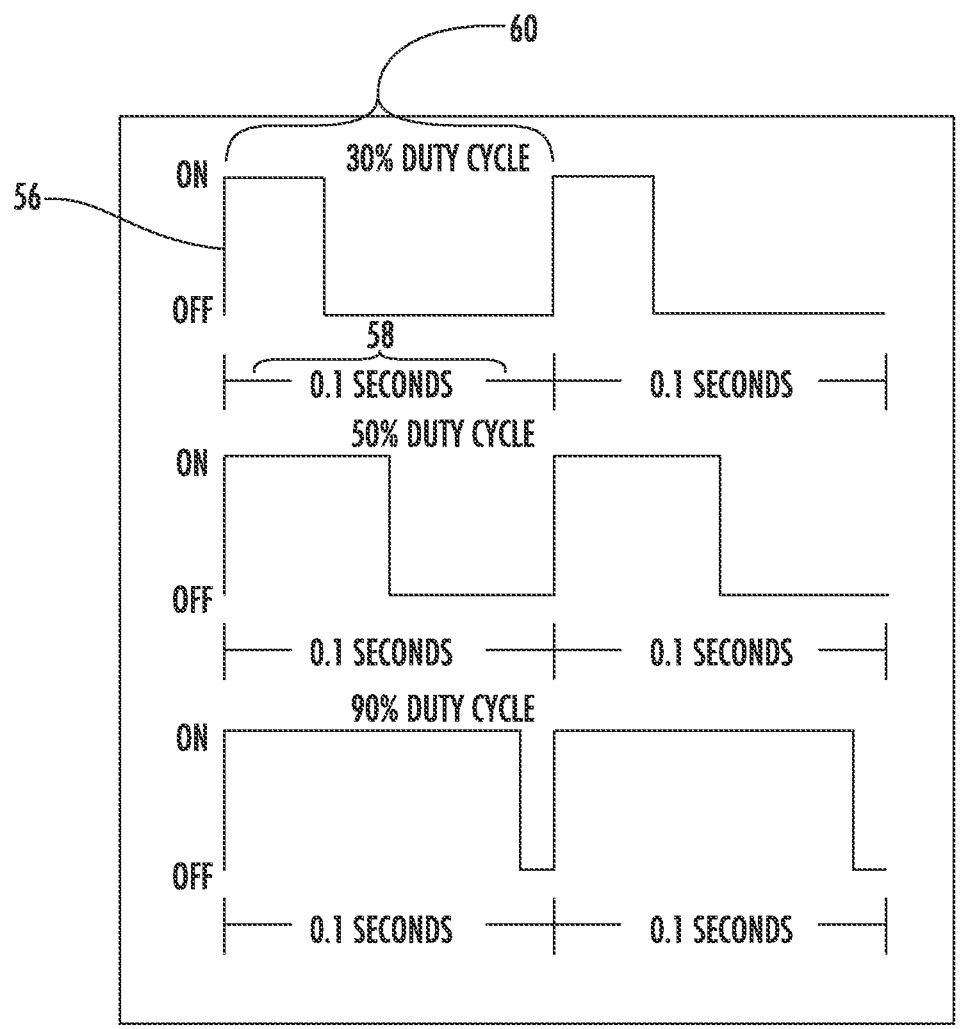
FIG. 5 is a diagram of a pulse width modulation technique for various duty cycles which may be employed in the spray system of FIG. 1.

Referring now to FIG. 5, example pulse width modulation (PWM) signals that may be used to actuate the nozzle assemblies 34 of FIGS. 1-4 are graphically depicted. In these examples, the electric signal 56 is pulsed with a fixed period length 58 of 0.1 seconds. When the signal 56 is high, i.e., when voltage is present, the pulse is in the ON position. As shown, the signal 56 remains high (or ON) for a portion of the period length 58 before switching low, i.e., to an OFF position, wherein no voltage is present. The relation of ON-time to period length 58 is called a duty cycle 60 and is measured in percent (%). Three example duty cycles of 30%, 50% and 90% are depicted in FIG. 5. As described with respect to FIGS. 3 and 4 above, the nozzle assemblies 34 will open and closed with this ON/OFF pulse. For example, when applied to the nozzle assemblies 34 described above with reference to FIGS. 2-4, if the duty cycle 60 is 50%, the resulting time-averaged resistance to flow will be double the total resistance to flow of an open nozzle assembly 34. Similar reciprocal results may occur with the 30% and 90% duty cycles 60. It should be appreciated, however, that the period length 58 provided in FIG. 5 is by way of example only. In other embodiments, any other suitable period length 58 may be provided.

Figure 6:
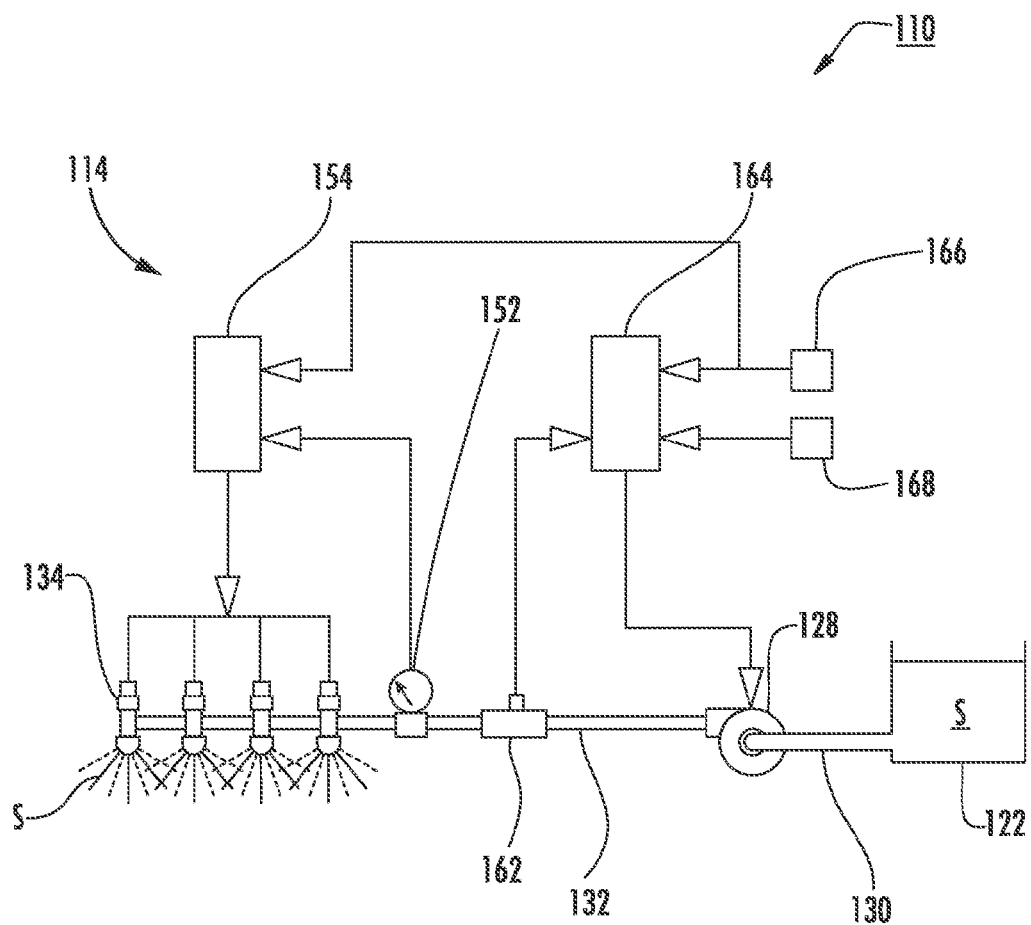
FIG. 6 is a schematic of an example spray system including a control system.

Referring now to FIG. 6, an example agricultural spray system 110 including a control system 114 is schematically depicted. The control system 114 generally includes a pressure sensor 152, a pressure controller 154, a flow meter 162, a flow controller 164, a speed input device 166, and a flow level or application rate input device 168. In certain embodiments, the spray system 110 of FIG. 6 may be used with or incorporate one or more aspects of the equipment, such as the work vehicle 12 and the spray system 10, described above with reference to FIGS. 1-4.

In operation, a product S flows from a tank 122 to a pulse width modulation controlled pump 128 via a suction pipe 130. In certain embodiments, the product S of FIG. 6 may be the same as the product S described above with reference to FIG. 1. The product S then flows through the flow meter 162 and the pressure sensor 152 to a plurality of nozzle assemblies 134, all via a boom pipe 132. Thus, the product S is delivered to a target, such as the crop or ground P in FIG. 1, via nozzle assemblies 134. In certain embodiments, the nozzle assemblies 134 of FIG. 6 may be, for example, configured as the nozzle assemblies 34 discussed above with reference to FIGS. 1-4.

Referring still to FIG. 6, the flow meter 162 measures a flow rate of the product S and sends a signal to the flow controller 164. As used herein, the term "flow rate" refers to the flow rate (in volume per unit time) of the product S through the boom pipe 132 and nozzle assemblies 134. As indicated, the flow controller 164 is in operative communication with the pump 128. Accordingly, the flow controller 164 may be configured to control the flow of product S through the system 110 by modifying certain operating parameters of the pump 128. For example, the flow controller 164 may increase or decrease the flow rate of the product S through the system 110 by increasing or decreasing a pulse frequency and/or duty cycle of the pump 128.

The flow controller 164 additionally receives target flow information from the application rate input device 168 and a travel speed from the speed input device 166. The application rate input device 168 may be configured to receive target application or flow rate information based on, e.g., a user input target application rate input at a user input device. The speed input device 166 may be any device capable of measuring a travel speed of the system 110, such as, for example, a travel speed of the work vehicle 12 in FIG. 1. Alternatively, the speed input device 166 may be configured to measure a relative travel speed, such as groundspeed, between the application target and one or more of the nozzle assemblies 134. In some embodiments, the speed input device 166 comprises, for example and without limitation, a GPS receiver.

The flow controller 164 is configured to adjust the flow rate of the product S through the system 110 based at least in part on the information received from the speed input device 166 and the application rate input device 168. For example, the flow controller 164 may receive a target, or desired, product flow input (e.g., an application rate) from a user through the application rate input device 168. The target product flow may be expressed in terms of product coverage per unit of area. Accordingly, the flow controller 164 may adjust the flow rate of the product S to achieve the target product flow, taking into account the travel speed of the system 110 received from the speed input device 166. In certain embodiments, for example, as the travel speed of the system 110 increases, the flow controller 164 will increase a flow rate of the product S through the system 110 to maintain the target product flow. Similarly, as the speed of the system 110 decreases, the flow controller 164 will decrease a flow rate of the product S through the system 110 to maintain the target product flow.

The pressure controller 154 is configured to control certain operating parameters of the nozzle assemblies 134 in order to control an upstream nozzle pressure, which for the embodiment illustrated in FIG. 6 may refer to a pressure of the product S in the boom pipe 132 upstream of the nozzle assemblies 134. Moreover, for the illustrated embodiment, the operating parameters controlled by the pressure controller 154 may include a pulse frequency and/or duty cycle of the nozzle assemblies 134. By varying a duty cycle and/or pulse frequency of the nozzle assemblies 134, the pressure controller 154 may vary the time-averaged flow resistance through the nozzle assemblies 134 and thus the upstream nozzle pressure. In certain embodiments, the upstream nozzle pressure may be maintained at a pressure set by a user via a user input device (not shown), or alternatively may be set to correspond to a pressure prescription map that varies the pressure based at least in part on the position of the system 110 in, e.g., a field.

As shown in FIG. 6, the pressure controller 154 is also configured to receive the travel speed information from the speed input device 166. Accordingly, when a flow rate of the product S is adjusted by the flow controller 164 in response to a change in speed of the system 110, the pressure controller 154 may anticipate this increase or decrease in flow rate. Further, the pressure controller 154 may adjust the frequency and/or duty cycle of the nozzle assemblies 134 in coordination with any adjustments to the flow rate by the flow controller 164 to offset any increase or decrease in upstream nozzle pressure that would otherwise accompany such an increase or decrease in the flow rate of the product S. The pressure controller 154 may therefore allow for a substantially constant upstream nozzle pressure regardless of any changes in travel speed of the system 110. Notably, by maintaining a substantially constant upstream nozzle pressure, the system 110 may provide for a spray stream having certain desired characteristics, such as a consistent droplet size.

As stated, the above configuration may maintain a substantially constant upstream nozzle pressure in the system 110 by changing the duty cycle and/or pulse frequency of the nozzle assemblies 134 in response to a sensed or determined change in system travel speed. Such a configuration improves over the prior systems in that the flow controller 164 does not need to be controlled in a manner to maintain the upstream nozzle pressure during changes in system travel speed. Instead, the flow controller 164 may simply be a proportional-integral-derivative (PID) type controller configured to account for a flow rate of the product S through the system 110 in response to the system travel speed.

With continued reference to FIG. 6, the example system 110 additionally includes a reactive means for ensuring a desired upstream nozzle pressure is maintained. More particularly, the system 110 includes the pressure sensor 152 to measure the upstream nozzle pressure and provide such pressure information to the pressure controller 154. The pressure controller 154 may react to a difference in a measured upstream nozzle pressure and a desired upstream nozzle pressure by modifying the frequency and duty cycle of the nozzle assemblies 134 accordingly.

The system 110 of FIG. 6 is provided by way of example only. In other embodiments, the system 110 may have any other suitable configuration that enables the system to function as described herein. For example, in certain embodiments, the pressure controller 154 may be the same controller as the flow controller 164, and additionally or alternatively, such controller may be a portion of a larger system controller, e.g., for the work vehicle 12 (FIG. 1). Additionally, the system 110 is not limited to any particular number or configuration of nozzle assemblies 134. Further, although the system 110 is depicted as including the pressure sensor 152, in other embodiments, the system 110 may not include the pressure sensor 152, or alternatively may include any other suitable means for measuring pressure in the boom pipe 132. Moreover, in still other embodiments, the pressure controller 154 and flow controller 164 may each be configured to receive travel speed information from separate speed input devices. In still other embodiments, the pump 128 may not be a pulse width modulation controlled pump, and the flow rate of the product S through the system 110 may instead be regulated by a flow valve, controlled by the flow controller 164 and positioned downstream of the pump 128.

The pressure controller 154 and the flow controller 164 may generally comprise any suitable computer and/or other processing unit, including any suitable combination of computers, processing units and/or the like that may be operated independently or in connection within one another. Thus, in several embodiments, the pressure controller 154 and/or the flow controller 164 may include one or more processor(s) and associated memory device(s) configured to perform a variety of computer-implemented functions including, but not limited to, the calculations disclosed herein, such as determining a duty cycle/system travel speed relationship associated with a nozzle (described below with reference to FIG. 8), calculating a change in speed of a spray system, and determining a duty cycle associated with the speed of the spray system based on a duty cycle/system travel speed relationship in accordance with the processes and methods described herein. As used herein, the term "processor" refers not only to integrated circuits, but also refers to a microcontroller, a microcomputer, a programmable logic controller (PLC), an application specific integrated circuit, and other programmable circuits. Additionally, the memory device(s) of the pressure controller 154 and/or the flow controller 164 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure and/or cause the associated controller to perform various functions including, but not limited to, controlling the duty cycle and/or pulse duration of the pump 128 to regulate the flow of product through the system 110, and controlling one or more operating parameters of the nozzle assemblies 134 (e.g., duty cycle and/or pulse duration) to control an upstream nozzle pressure of the system 110.

Figure 7:
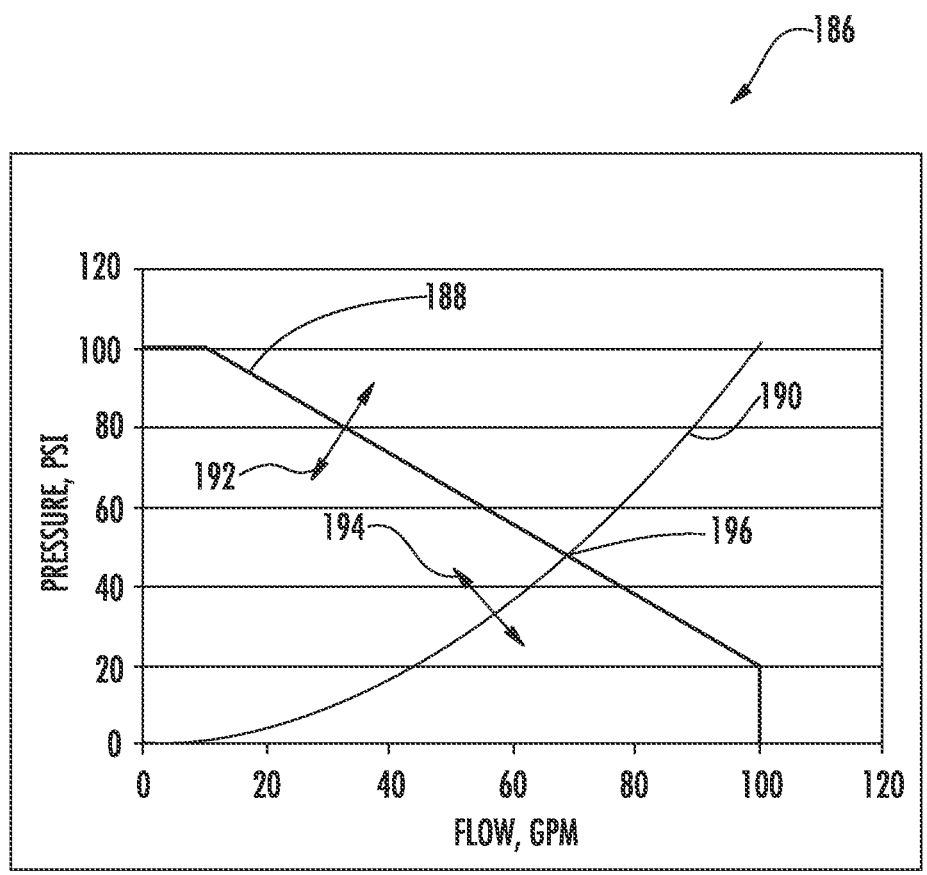
FIG. 7 is a graph showing an interdependent relationship between flow control and pressure control when the control system of FIG. 5 is used to control a spray system.

Referring now to FIG. 7, a graph 186 is provided generally showing an interdependent relationship between flow control and pressure control when the control system of FIG. 6 is used to control a spray system. As shown, a control system in accordance with the present disclosure allows a pressure control system curve 190 to be shifted in various directions indicated by a bidirectional arrow 194, which is an independent shift from a change in a flow controller system curve 188 indicated by a bidirectional arrow 192. The result is that an intersection 196 may be navigated to any flow and pressure setting desired by an operator or other user, within limits of the system. This ability, when controlled by flow and pressure controllers, allows the operator to set flow and pressure set points independently, and have both set points maintained. In addition, the flow set point may be changed throughout a range of speed without effecting the pressure set point, and vise versa.

Figure 8:
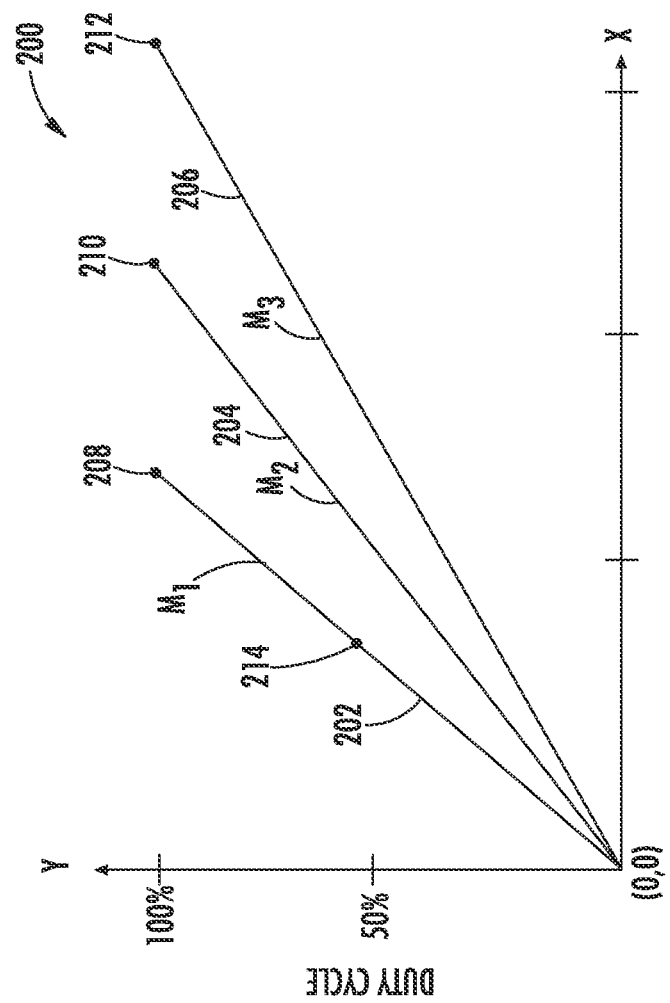
FIG. 8 is a graph showing a relationship between duty cycle and travel speed for three different nozzle assemblies at a target pressure.

FIG. 8 is a graph 200 depicting generally a relationship between the duty cycle 60 of the nozzle assemblies 134 and the travel speed of the system 110 of FIG. 6 which may be used to govern operation of the system 110 and the nozzle assemblies 134 to maintain a constant back pressure of the product S in the system 110 at varying travel speeds and flow rates of product S within the system 110. More particularly, FIG. 8 depicts the duty cycle/system travel speed relationship, at a constant back pressure, for three different nozzle assemblies having three different nozzle tip sizes. For example, line 202 depicts a first nozzle assembly having a relatively small nozzle tip size, line 204 depicts a second nozzle assembly having a medium nozzle tip size, and line 206 depicts a third nozzle assembly having a relatively large nozzle tip size. The "maximum speed" for a nozzle assembly 134 at a particular pressure is proportional to the nozzle's tip size. The maximum speed refers to a maximum travel speed at which the system 110 may travel with the nozzle assemblies 134 maintaining the desired back pressure. For example, once the maximum speed of a nozzle assembly 134 is exceeded, even if the nozzle assembly's duty cycle 60 is set to 100% (i.e., completely open), the nozzle assembly will not be able to spray the product S quickly enough to prevent an increase in back pressure. Accordingly, the first nozzle assembly defines a maximum speed at 208 that is less than the second nozzle assembly's maximum speed at 210, which is, in turn, less than the third nozzle assembly's maximum speed at 212.

Referring still to the graph 200 of FIG. 8, each of the nozzle assemblies 134 define an origin at a 0% duty cycle where the system 110 travel speed is also zero (0). Additionally, as shown, the duty cycle/system travel speed relationship may be linear when the back pressure is held constant. Therefore, the lines 202, 204, and 206 may define a constant slope $M_1$, $M_2$, and $M_3$, respectively, as the duty cycle increases from 0% to 100% and the system 110 travel speed increases from zero (0) to the maximum speed at points 208, 210, and 212, respectively.

Notably, the flow rate of the product S through the system 110 may also be linearly related to the travel speed of the system 110. Accordingly, in other embodiments the graph 200 may similarly plot the duty cycle 60 of a nozzle assembly 134 against a flow rate of the product S, at a constant pressure, with similar results.

During use of the spray system 110 depicted in FIG. 6, an operator or user may replace the nozzle assemblies 134 (or nozzle heads 39, shown in FIG. 2) on the boom pipe 132 in order to obtain a desired flow pattern or other desired flow characteristics. The replacement nozzle assemblies 134 or nozzle heads 39 may have a different nozzle tip size, and thus may define a different duty cycle/system travel speed relationship (e.g., a different slope, such as $M_1$, $M_2$ and $M_3$). It may be beneficial for the pressure controller 154 to have the duty cycle/system travel speed relationship information received, stored, or otherwise determined such that the pressure controller 154 may increase or decrease the duty cycle 60 of the nozzle assemblies 134 an appropriate amount in response to an increase or decrease in travel speed to maintain the constant pressure.

In certain embodiments, the operator or user may provide the pressure controller 154 directly, or via a general system controller or other suitable user input device, one or more inputs indicative of the nozzle assemblies 134 being used. The pressure controller 154 may then accurately increase or decrease the duty cycles 60 of the nozzle assemblies 134 during operation of the system 110 in response to an increase or decrease in the travel speed of the system 110 in order to maintain the constant pressure.

Alternatively, the pressure controller 154 may be configured to determine nozzle assembly information, such as the nozzle tip size and/or the duty cycle/system travel speed relationship (including, for example, the slope of the linear relationship and/or the maximum speed for the nozzle), without receiving such nozzle assembly information from a user. For example, as depicted in FIG. 6, the pressure controller 154 may receive the travel speed of the system 110, the pressure (or back pressure) of the system 110, and the current duty cycle information of the nozzle assemblies. At a constant (i.e., steady-state) pressure, the pressure controller 154 may determine a reference point, such as reference point 214, on the duty cycle/system travel speed graph, and further, may determine the slope (such as slope $M_1$, $M_2$, and $M_3$) for the duty cycle/system travel speed linear relationship corresponding to the nozzle assemblies 134 (or nozzle heads 39) being used based on the reference point 214. Specifically, the pressure controller 154 may determine the slope for the duty cycle/system travel speed linear relationship that corresponds to the nozzle assemblies 134 being used with the system by extrapolating a line between the reference point 214 and the origin (0,0). Moreover, once the slope for the duty cycle/system travel speed linear relationship is determined, the pressure controller 154 may determine the full duty cycle/system travel speed relationship for the nozzle assemblies 134 being used by extrapolating a line with the determined slope from the reference point 214 to a point that corresponds to a 100% duty cycle of the nozzle assemblies. Based on the determined duty cycle/system travel speed relationship, the pressure controller 154 may adjust or regulate the duty cycle of the nozzle assemblies 134 in response to a change in travel speed of the system 110 to maintain a constant pressure within the system 110.

In some embodiments, the pressure controller 154 is configured to make the above determination after it is determined that the system 110 is in a steady state condition. For example, the pressure controller 154 may make the above determination after it determines the system 110 has been operating without any substantial change in pressure, duty cycle, travel speed, and/or flow rate for a predetermined amount of time. Such predetermined amount of time may be approximately one (1) second, approximately three (3) seconds, approximately five (5) seconds, or any other suitable time frame. As used herein with reference to the predetermined amount of time used to determine if the system 110 is in a steady state condition, "approximately" refers to a number being within a 10% margin of error.

Figure 9:
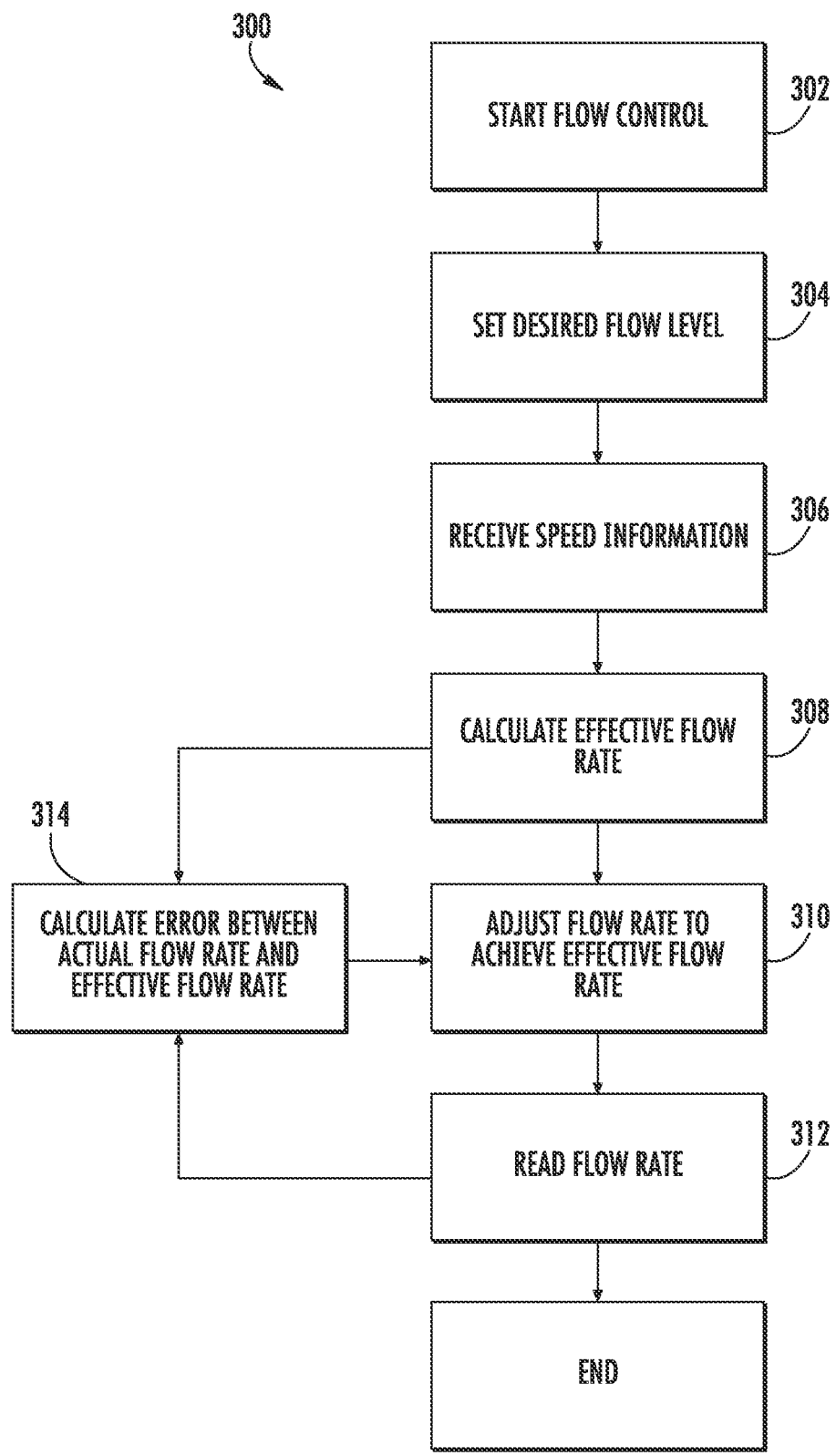
FIG. 9 is a flow chart of an example method for controlling a flow of product in an agricultural spray system.
Figure 10:
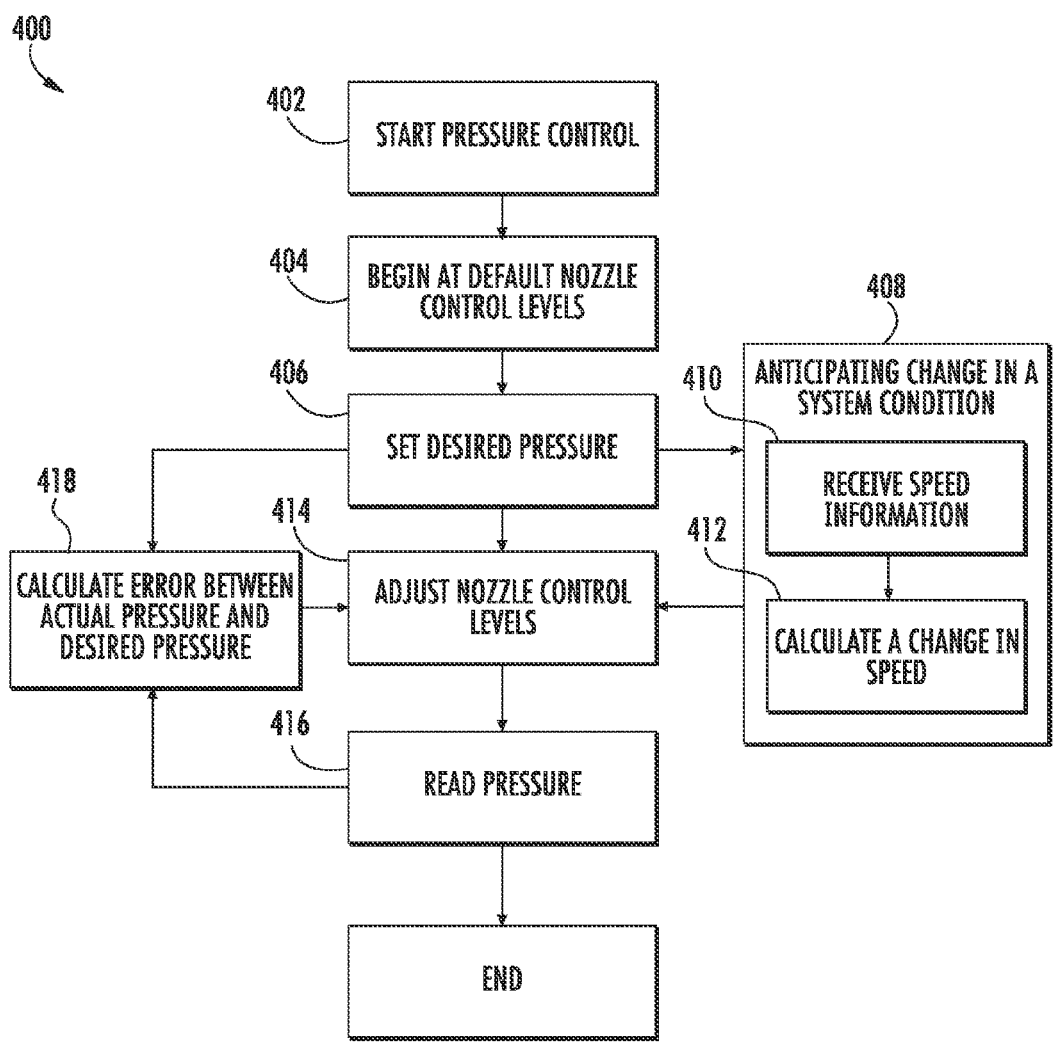
FIG. 10 is a flow chart of an example method for controlling a pressure of product in an agricultural spray system.

With reference now to FIGS. 9 and 10, an example method 300 for controlling a flow rate of a product spray system and an example method 400 for controlling a pressure in a product spray system are provided, respectively. The flow rate referenced in the method 300 of FIG. 9 may be the flow rate of product S through the system 110 described above with reference to FIG. 6. Similarly, the pressure referenced in the method 400 of FIG. 10 may be the upstream nozzle pressure in the system 110 described above with reference to FIG. 6.

Referring now specifically to the method 300 of FIG. 9, the method 300 includes start-up of the flow control at 302 and setting a desired flow level at 304. The desired flow level at 304 may be expressed in flow rate per unit area. In the example embodiment, the method 300 additionally includes receiving speed information at 306, which may be a travel speed of the spray system, or of a working vehicle towing the spray system. In other embodiments, the speed information may be a relative travel speed, such as groundspeed (e.g., a ground speed proximate to one or more nozzle assemblies of the spray system), between the application target and one or more of the nozzle assemblies 134. The method 300 further includes calculating an effective flow rate at 308 that corresponds to the desired flow level set at 304. The effective flow rate calculated at 308 may be calculated based, at least in part, on the speed information received at 306. The method 300 further includes adjusting at 310 the flow rate of the spray system based on the effective flow rate calculated at 308. Adjusting the flow rate of the spray system at 310 may include adjusting a pulse frequency and/or a duty cycle of a system pump, such as the pump 128 described above with reference to FIG. 6. Additionally, the method 300 includes reading or receiving at 312 an actual flow rate of the spray system. The actual flow rate may be read or received at 312, for example, from a flow meter positioned downstream of the system pump, for example, in a boom pipe of the spray system.

Referring still to the example method 300 of FIG. 9, the method 300 further includes at 314 calculating an error as a difference between the actual flow rate read at 312 and the effective flow rate calculated at 308 and, based on the error calculated at 314, further adjusting the flow rate at 310. The method 300 of FIG. 9 may be operated continuously while the spray system is active. The method 300 of FIG. 9 is provided by way of example only. In other embodiments, any other suitable method and/or means may be provided for controlling a flow rate of the spray system.

Referring now to FIG. 10, the example method 400 includes at 402 starting pressure control of the spray system, which in certain embodiments may be the spray system 110 depicted in FIG. 6. The example method 400 additionally includes at 404 beginning control using default nozzle assembly control levels or operating parameters (e.g., a default duty cycle and/or a default pulse frequency) until flow of a product through the system is established. For example, the method 400 may operate the nozzle assemblies at a 50% duty cycle until flow is established. It should be appreciated, however, that in other embodiments of the present disclosure, the method 400 may not include using defaults for a predetermined amount of time at 404, or alternatively, may use any other suitable default controls.

The example method 400 of FIG. 10 further includes at 406 setting a desired pressure, or target pressure, for the system. The desired or target pressure may be set at 406 based on, for example, one or more user inputs and/or one or more operating parameters of the spray system. In one embodiment, for example, the desired or target pressure is set at 406 based on a user input target pressure for the system. In other embodiments, the desired or target pressure may be set at 406 based on other user inputs, including, for example and without limitation, a spray nozzle assembly or spray tip size or type, a target flow rate, a target application rate, a target droplet size, and/or any other suitable user input that enables the method 400 to be performed as described herein. In such embodiments, the method 400 may further include determining the desired or target pressure to be set at 406 based on the user inputs.

The method 400 further includes at 408 anticipating changes in a condition of the system indicative of a change in the pressure of the system. More particularly, the example method 400 includes at 410 receiving speed information of the system and at 412 calculating a change in speed of the system. The speed information received at 410 may be a travel speed of the spray system, or of a work vehicle towing the spray system. Alternatively, the speed information received at 410 may be a ground speed proximate to one or more nozzle assemblies of the spray system. Moreover, the speed information received at 410 may be the same speed information received at 306 in the method 300 of FIG. 9, and receiving speed information at 410 may occur substantially simultaneously with receiving speed information at 306.

The change in speed calculated at 412 may indicate an upcoming change in one or more system conditions, which if uncorrected for, would change the pressure in the system. The system conditions for which the change is anticipated may include, for example and without limitation, a flow rate of product through the system and a system pressure (e.g., an upstream nozzle pressure). For example, in embodiments where the spray system is configured to increase or decrease the flow rate of product through the system based on an increase or decrease in the travel speed of the system (e.g., to maintain a constant application rate), the change in speed calculated at 412 is indicative of an upcoming change in flow rate of product through the system and, consequently, an upcoming change in system pressure.

The method 400 accounts for the anticipated change in pressure of the system by adjusting the nozzle assemblies at 414, for example, by adjusting one or more nozzle assembly control levels or operating parameters (e.g., a duty cycle and/or a pulse frequency). The adjustment of nozzle assembly operating parameters at 414 in response to the change in speed calculated at 412 may allow for the system to increase or decrease the flow rate through the system and substantially simultaneously adjust the nozzle assemblies (e.g., the duty cycle and/or the pulse frequency) such that there is no appreciable change in the pressure of the system. Thus, as compared to previous spray systems, the method 400 facilitates reducing or eliminating pressure fluctuations within the system that may otherwise result from changes in system conditions, such as the flow rate of product through the system.

Adjusting the nozzle assemblies at 414 may include, for example, adjusting one or more operating parameters of the nozzle assemblies (e.g., the duty cycle and/or pulse frequency) according to a duty cycle/system travel speed relationship associated with the nozzle assemblies being used with the spray system. More specifically, the duty cycle of the nozzle assemblies may be set to a duty cycle that corresponds to a travel speed of the system calculated at 412 according to the duty cycle/system travel speed relationship associated with the nozzle assemblies being used with the spray system.

The method 400 of FIG. 10 additionally includes reading or receiving an actual pressure of the system at 416 and at 418 calculating an error between the actual pressure read at 416 and the target pressure, or desired pressure, set at 406. In response to a calculated error at 418, the method 400 may adjust the nozzle assemblies at 414. Accordingly, the method 400 additionally includes a reactive means for maintaining a substantially constant pressure. The method 400 of FIG. 10 may be operated continuously while the spray system is active.

The methods 300 and 400 depicted in FIGS. 9 and 10, respectively, are provided by way of example only. In other embodiments, the methods 300 and/or 400 may not include all the various steps depicted in FIGS. 9 and 10, may include additional steps not depicted in FIGS. 9 and 10, and additionally or alternatively, may include any of the steps in any suitable order or in parallel with one or more other steps.

The example methods 300 and 400 of FIGS. 9 and 10, respectively, may be performed at least in part using any suitable processor or controller. Additionally, the methods 300, 400 may be performed using a common controller, or alternatively may be performed using separate controllers. In some embodiments, for example, the method 300 is performed using the flow controller 164 described above with reference to FIG. 6, and the method 400 is performed using the pressure controller 154 described above with reference to FIG. 6.

Further, in certain embodiments, a hand-held input device may be provided, for example, in the cab 14 of the work vehicle 12, depicted in FIG. 1. Such a device may be in communication with the one or more controllers configured to perform the methods 300 and/or 400 of FIGS. 9 and 10, and/or the pressure controller 154 and the flow controller 164 schematically represented in FIG. 6. Such a device may be configured to receive the user inputs, such as a target pressure and a target flow rate. Alternatively, the user may input a desired operation mode, which will have predetermined values for the target pressure and/or target flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A spray system configured to dispense a product as the system is moved at a travel speed, the system comprising:
   a tank configured to hold a quantity of the product;
   a conduit in fluid communication with the tank for transporting the product;
   a pump in fluid communication with the conduit for generating a pressure in the conduit and a flow of the product through the conduit;
   a flow controller configured to regulate a flow rate of the product through the conduit based at least in part on the travel speed of the system;
   a plurality of electrically actuated nozzle assemblies in fluid communication with the conduit and configured to dispense the product such that an upstream nozzle pressure is established within the conduit; and
   a pressure controller configured to receive speed information indicative of the travel speed of the system and control at least one operating parameter of at least one of the plurality of nozzle assemblies based at least in part on the received speed information to maintain a substantially constant upstream nozzle pressure, wherein the pressure controller is configured to determine an anticipated change in the flow rate of the product through the system based on the speed information received by the pressure controller, and to control the at least one operating parameter of the at least one of the plurality of nozzle assemblies based on the anticipated change in the flow rate of the product.

2. The system of claim 1, wherein the at least one operating parameter includes a pulse frequency and a duty cycle of the plurality of nozzle assemblies.

3. The system of claim 1, wherein the pump is a pulse width modulation controlled pump and the flow controller is configured to control a duty cycle and pulse frequency of the pump.

4. The system of claim 3, wherein the flow controller increases or decreases the flow rate of the product through the conduit based at least in part on an increase or decrease in the travel speed of the system.

5. The system of claim 1, wherein the substantially constant upstream nozzle pressure is a target upstream nozzle pressure, and wherein the pressure controller is configured to control the at least one operating parameter of the at least one of the plurality of nozzle assemblies based at least in part on a duty cycle/system travel speed relationship associated with the target upstream nozzle pressure.

6. The system of claim 5, wherein the duty cycle/system travel speed relationship is provided by a user input.

7. The system of claim 5, wherein the pressure controller is configured to determine the duty cycle/system travel speed relationship based on the travel speed of the system and a duty cycle at which the plurality of nozzle assemblies is operating during a steady state condition of the system.

8. The system of claim 5, wherein the pressure controller is configured to determine the duty cycle/system travel speed relationship based on the flow rate of the product through the system and a duty cycle at which the plurality of nozzle assemblies is operating during a steady state condition of the system.

9. A method of dispensing a product from a spray system moving at a travel speed, the system including a tank, a conduit in fluid communication with the tank, and a pump in fluid communication with the conduit, the method comprising:
   directing the product from the tank through the conduit to a plurality of electrically actuated nozzle assemblies;
   regulating, using a flow controller, a flow rate of the product through the conduit based at least in part on the travel speed of the system;
   dispensing the product from the plurality of nozzle assemblies such that an upstream nozzle pressure is established within the conduit;
   receiving, at a pressure controller, speed information indicative of the travel speed of the system;
   determining an anticipated change in the flow rate of the product based on the speed information received by the pressure controller; and
   controlling, using the pressure controller, at least one operating parameter of at least one of the plurality of nozzle assemblies based on the anticipated change in the flow rate of the product such that the upstream nozzle pressure is maintained at a substantially constant pressure.

10. The method of claim 9, wherein the substantially constant pressure is a target upstream nozzle pressure, and wherein controlling the at least one operating parameter of the at least one of the plurality of nozzle assemblies includes controlling the at least one operating parameter of the at least one of the plurality of nozzle assemblies based at least in part on a duty cycle/system travel speed relationship associated with the target upstream nozzle pressure.

11. The method of claim 10, further comprising determining the duty cycle/system travel speed relationship based on the travel speed of the system and a duty cycle at which the plurality of nozzle assemblies is operating during a steady state condition of the system.

12. The method of claim 9, wherein the at least one operating parameter includes a pulse frequency and a duty cycle of the plurality of nozzle assemblies.

13. The method of claim 9, wherein the pump is a pulse width modulated pump, the method further comprising controlling the flow rate of the product through the conduit by controlling at least one of a duty cycle and a pulse frequency of the pump.

14. The method of claim 13, further comprising at least one of increasing or decreasing the flow rate of the product through the conduit based on a corresponding increase or decrease in the travel speed of the system.

15. A control system for use with a spray system, the control system comprising:
at least one speed input device configured to measure a travel speed of at least one of the control system and the spray system;
a flow controller operatively connected to the at least one speed input device, the flow controller configured to regulate a flow rate of product through a conduit of the spray system based at least in part on the travel speed; and
a pressure controller configured to receive speed information indicative of the travel speed and to control at least one operating parameter of at least one of a plurality of electrically actuated nozzle assemblies in fluid communication with the conduit based at least in part on the received speed information such that a substantially constant upstream nozzle pressure is maintained within the spray system, wherein the pressure controller is configured to determine an anticipated change in the flow rate of the product through the system based on the speed information received by the pressure controller, and to control the at least one operating parameter of the at least one of the plurality of nozzle assemblies based on the anticipated change in the flow rate of the product.

16. The control system of claim 15, wherein the at least one operating parameter includes a pulse frequency and a duty cycle of the plurality of nozzle assemblies.

17. The control system of claim 15, wherein the substantially constant upstream nozzle pressure is a target upstream nozzle pressure, and wherein the pressure controller is configured to control the at least one operating parameter of the at least one of the plurality of nozzle assemblies based at least in part on a duty cycle/system travel speed relationship associated with the target upstream nozzle pressure.

18. The control system of claim 17, wherein the pressure controller is configured to determine the duty cycle/system travel speed relationship based on the travel speed and a duty cycle at which the plurality of nozzle assemblies are operating during a steady state condition of the spray system.

* * * * *